United States Patent [19]
Seino

[11] Patent Number: 5,995,685
[45] Date of Patent: Nov. 30, 1999

[54] OPTICAL MODULATOR AND AN OPTICAL MODULATING METHOD

[75] Inventor: Minoru Seino, Kawasaki, Japan

[73] Assignee: Fujitsu Limited, Kawasaki, Japan

[21] Appl. No.: 09/049,989

[22] Filed: Mar. 30, 1998

[30] Foreign Application Priority Data

Sep. 26, 1997 [JP] Japan ................................. 9-262414

[51] Int. Cl.⁶ .................................................. G02F 1/035
[52] U.S. Cl. .................................. 385/3; 385/2; 359/183; 359/279
[58] Field of Search ........................... 385/2, 3; 359/183, 359/279

[56] References Cited

U.S. PATENT DOCUMENTS

| | | | |
|---|---|---|---|
| 5,101,450 | 3/1992 | Olshansky | 385/3 |
| 5,161,206 | 11/1992 | Djupsjobacka | 385/2 |
| 5,278,923 | 1/1994 | Nazarathy et al. | 385/3 |
| 5,408,544 | 4/1995 | Seino | 385/3 |
| 5,699,179 | 12/1997 | Gopalakrishnan | 359/183 |

FOREIGN PATENT DOCUMENTS 2-291518   12/1990   Japan .
7-020414   1/1995    Japan .
7-049473   2/1995    Japan .

*Primary Examiner*—Scott J. Sugarman
*Assistant Examiner*—Margaret Burke
*Attorney, Agent, or Firm*—Staas & Halsey LLP

[57] ABSTRACT

An optical modulator suitable for use in, for example, a terminal apparatus in an optical communication system when an optical signal is modulated has a power splitting unit for splitting a power of an incident light into two split lights, a first intensity modulating unit for performing an intensity modulation on one of the split lights split by the power splitting unit and outputting an intensity-modulated optical signal containing a direct current component, an optical phase shifting unit for performing a phase shift on the other of the split lights split by the power splitting unit such that the light has a phase opposite to that of the intensity-modulated optical signal, and a direct current component suppressing unit for making the intensity-modulated optical signal and the light subjected to the phase shift interfere with each other to suppress the direct current component contained in the intensity-modulated optical signal and outputting the intensity-modulated optical signal, thereby obtaining the modulated optical signal with a high extinction ratio although being driven at a low voltage.

11 Claims, 16 Drawing Sheets

$$D = \frac{B+C}{2}$$

ed optical signal and the light subjected to the phase shift interfere with each other to suppress the direct current component contained in the intensity-modulated optical signal.

OPTICAL MODULATOR AND AN OPTICAL MODULATING METHOD

BACKGROUND OF THE INVENTION (1) Field of the Invention

The present invention relates to an optical modulator and an optical modulating method suitable for use when an optical signal is modulated in, for example, a terminal apparatus in an optical communication system.

(2) Description of Related Art

In recent years, it is required to transmit an enormous volume of information, with development of a highly information-oriented society. As means for transmitting such an enormous volume of information, there are used optical communication systems transmitting information as optical signals.

In the optical communication system, a higher transmission speed is required year after year since a modulation rate of signals is increased more and more. For this, optical devices of an optical waveguide type such as external modulators or the like for high-speed modulation of signals are used in various places.

In the optical modulator used in such an optical communication system, there are expectation for a higher modulation rate and a demand for a lower voltage used to drive the optical modulator in order to decrease a size of a chip of the optical modulator. Namely, there is a demand for an optical modulator which can modulate light at a high-rate and can be driven at an extremely low voltage.

In order to drive a known optical modulator at a low voltage, there are assumed two manners. Namely, the modulator is driven at a low voltage [$V_0$–$V_1$ shown in FIG. 16(*a*)] in the vicinity of 0 output of an output light power as shown in FIG. 16(*a*), or the modulator is driven at a low voltage [$V_0'$–$V_1'$ shown in FIG. 16(*b*)] in a portion where a slope of the output light power is the steepest, as shown in FIG. 16(*b*).

However, when the known optical modulator is driven at a low voltage in the vicinity of 0 output of the output optical power, it is impossible to obtain a large modulated optical signal since the output optical power is a sine wave waveform, as shown in FIG. 16(*a*). When such the modulated optical signal is used in the optical communication system, information in the optical signal is lost because of degradation of the optical signal waveform upon transmission.

On the other hand, when the optical modulator is driven at a low voltage in a portion where the slope of the output optical power is the steepest, an extinction ratio is degraded since a direct current light [indicated by reference character d in FIG. 16(*b*)] is superimposed on the modulated optical signal although a large modulated optical signal can be obtained, as shown in FIG. 16(*b*).

SUMMARY OF THE INVENTION

In the light of the above problems, an object of the present invention is to provide an optical modulator and an optical modulating method, which can yield a modulated optical signal of a high extinction ratio although the modulator is driven at a low voltage.

The present invention therefore provides an optical modulator comprising a power splitting unit for splitting a power of an incident light into two split lights, a first intensity modulating unit for performing an intensity modulation on one of the split lights split by the power splitting unit and outputting an intensity-modulated optical signal containing a direct current component, an optical phase shifting unit for performing a phase shift on an optical phase of the other of the split lights split by the power splitting unit such that the split light has a phase opposite to that of the intensity-modulated optical signal, and a direct current component suppressing unit for making the intensity-modulated optical and the light subjected to the phase shift by the optical phase shifting unit interfere with each other to suppress the direct current component contained in the intensity-modulated optical signal.

The power splitting unit may split the incident light such that a power of the other split light is equal to the direct current component contained in the intensity-modulated optical signal.

Alternatively, the power splitting unit may split the incident light such that a power of the other split light is equal to the maximum level of the intensity-modulated optical signal.

Still alternatively, the power splitting unit may split the incident light such that a power of the other split light is an optical power intermediate between the maximum level of the intensity-modulated optical signal and the direct current component.

The power splitting unit, the first intensity modulating unit, the optical phase shifting unit and the direct current component suppressing unit may be integrally formed using optical waveguide elements formed on an optical substrate.

At this time, the optical phase shifting unit may be an optical waveguide on the optical substrate, an optical path length of which is so adjusted that the other of the split lights split by the power splitting unit has a phase opposite to that of the intensity-modulated optical signal.

The optical phase shifting unit may perform a phase modulation on an optical phase of the other of the split lights split by the power splitting unit.

The second intensity modulating unit for performing the intensity modulation on the other of the split lights split by the power splitting unit and the optical phase shifting unit may be integrally formed.

The present invention further provides an optical modulator comprising a power splitting unit for splitting a power of an incident light into two split lights, a modulating unit for performing an intensity modulation and a phase modulation on one of the split lights split by the power splitting unit, and outputting an optical signal containing a direct current component, an optical phase shifting unit for performing a phase shift on an optical phase of the other of the split lights split by the power splitting unit such that the light has a phase opposite to that of the above optical signal from the modulating unit, and a direct current component suppressing unit for making the optical signal from the modulating unit and the light subjected to the phase shift by the optical phase shifting unit interfere with each other to suppress the direct current component contained in the optical signal from the modulating unit, and outputting the optical signal.

The present invention still further provides an optical modulating method comprising the steps of, when a light propagated through an optical waveguide formed on a birefringent substrate is modulated and outputted, splitting an incident light into two split lights, performing an intensity modulation on one of the split lights containing a direct current component, while performing a phase shift on an optical phase of the other of the split lights such that the light has a phase opposite to that of an optical signal subjected to the intensity modulation, and making the intensity-modulated optical signal and the light subjected to the phase shift to suppress the direct current component contained in the intensity-modulated optical signal, and outputting the intensity-modulated optical signal.

According to the optical modulator and the optical modulating method of this invention, an intensity-modulated optical signal which is one split light obtained by splitting a power of an incident light and a light subjected to a phase shift which is the other split light are made interfere with each other to suppress a direct current component contained in the intensity-modulated optical signal, and the intensity-modulated optical signal is outputted. Whereby, it is possible to obtain a modulated optical signal with a high extinction ratio while the optical modulator is driven at a low voltage, which leads to a decrease in scale of a chip of the optical modulator.

The optical phase shifting unit performs a phase modulation on an optical phase of the other of the split lights split by the power splitting unit so that a direct current component contained in the intensity-modulated optical signal can be suppressed more effectively.

The second intensity modulating unit for performing the intensity modulation on the other of the split lights obtained by splitting a power of the incident light by the power splitting unit and the optical phase shifting unit are integrally formed so that the second intensity modulating unit can vary an intensity of the split light. Accordingly, the optical modulator can be driven in a state of an arbitrary modulation or at an arbitrary minute voltage, with a high extinction ratio.

The optical modulator has the modulating unit for performing the intensity modulation and the phase modulation on the other of the split lights split by the power splitting portion and outputting an optical signal containing a direct current component. It is therefore possible to suppress the direct current component contained in the intensity-modulated optical signal more effectively since the modulating unit complementarily adjusts a state of phases of the two split lights.

DESCRIPTION OF THE PREFERRED EMBODIMENTS

Hereinafter, description will be made of embodiments of this invention with reference to the drawings.

(a) Description of a First Embodiment

Figure 1:
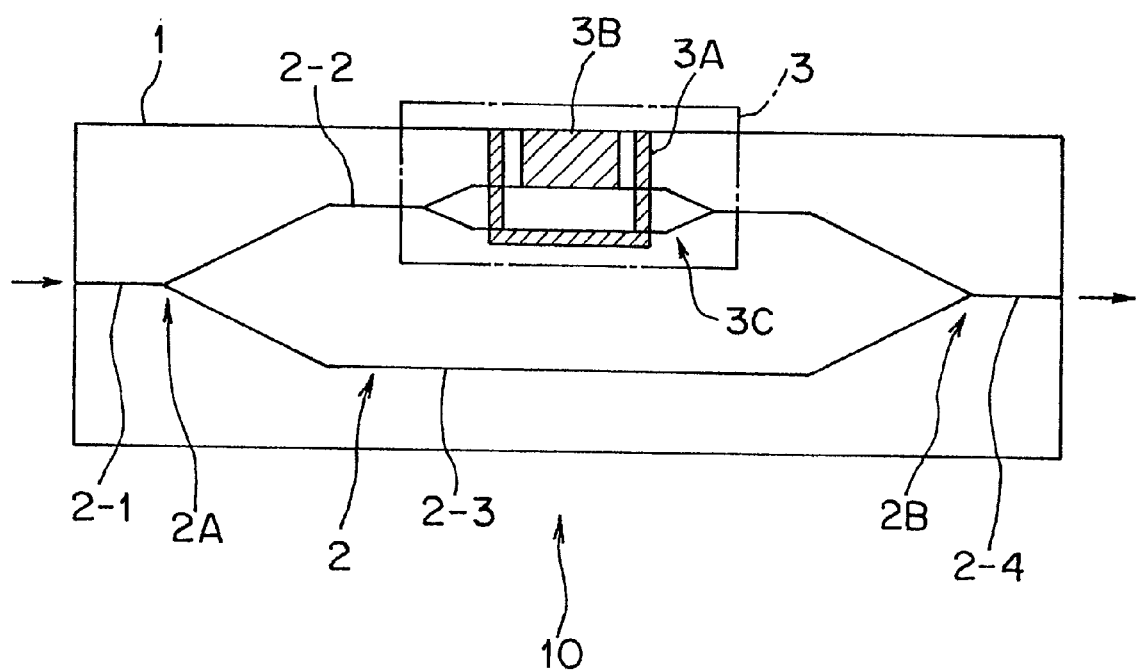
FIG. 1 is a schematic diagram showing a structure of an optical modulator according to a first embodiment of this invention.

FIG. 1 is a schematic diagram showing a structure of an optical modulator according to a first embodiment of this invention.

An optical modulator 10 shown in FIG. 1 is used as an external optical modulator for modulating a light emitted from a signal light source such as a semiconductor laser or the like in, for example, a transmitting unit of an ultra-high-speed optical communication system.

An optical waveguide 2 and an intensity modulating unit 3 are formed on a substrate 1 to form the optical modulator 10, in which a light propagated through the optical waveguide 2 is modulated and emitted.

The substrate 1 has an electrooptic effect. As the substrate 1, a lithium niobate substrate whose crystal structure is cut in the Z-axis direction (Z-cut $LiNbO_3$ substrate) is used.

The optical waveguide 2 is configured with an input waveguide 2-1, intermediate waveguides 2-2 and 2-3, and an output waveguide 2-4. The intermediate waveguides 2-2 and 2-3 are connected in parallel to the input waveguide 2-1 and the output waveguide 2-4 via a Y-shaped splitting portion 2A and a Y-shaped recombining portion 2B.

The Y-shaped splitting unit 2A splits a power of an incident light into two splitted lights, which functions as a power splitting unit. According to the first embodiment, the Y-shaped splitting unit 2A equally splits the incident light from the input waveguide 2-1.

The intensity modulating unit 3 has an optical waveguide 3C of a Mach-Zehnder type, a travelling-wave electrode 3A and a grounding electrode 3B, which is formed in a part of either the intermediate waveguide 2-2 or 2-3 (the intermediate waveguide 2-2 in FIG. 1).

Figure 16A:
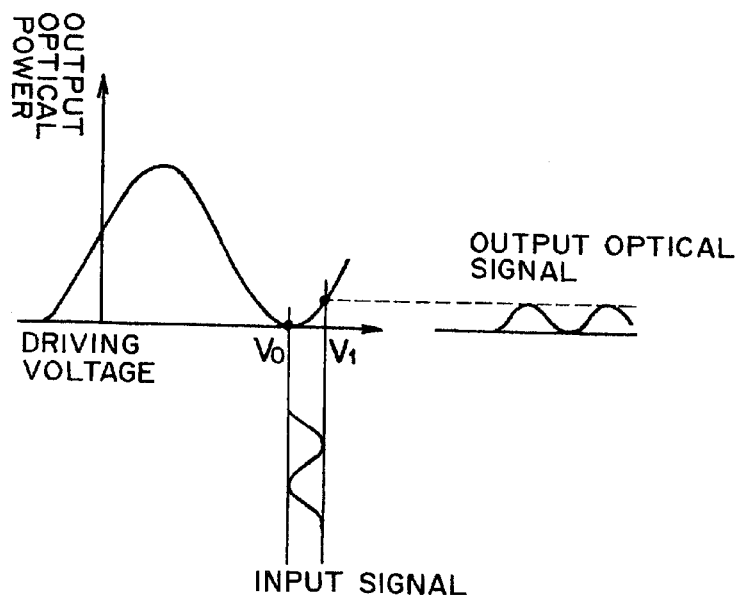
FIGS. 16(a) and 16(b) are diagrams for illustrating an operation of a known optical modulator.
Figure 16B:
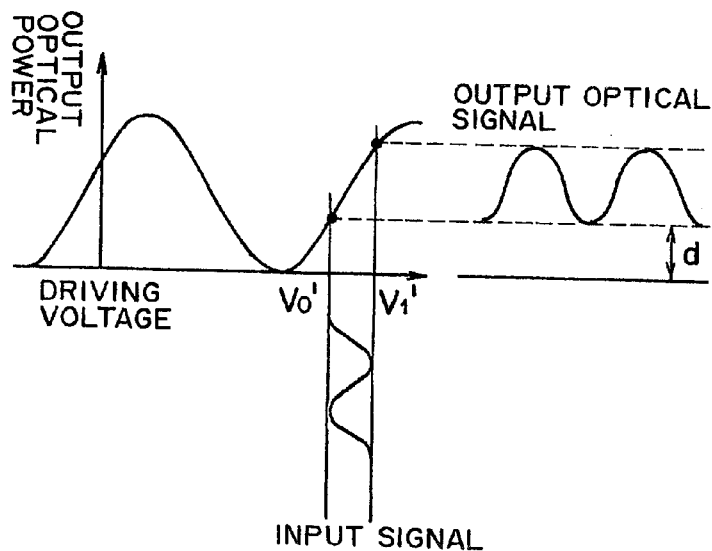

The intensity modulating unit 3 has a function similar to that of known optical modulators of a Mach-Zehnder type. According to the first embodiment, the intensity modulating unit 3 is driven at a low voltage [$V_0'$–$V_1'$ shown in FIG. 16(b)] in a portion where the slope of the output optical power is the steepest, as shown in FIG. 16(b) mentioned above. When the intensity modulating unit 3 is driven at a low voltage in a portion where the slope of the output optical power is the steepest, a direct-current light [reference numeral d in FIG. 16(b)] is superimposed on the optical signal whose intensity has been modulated, as described before. Therefore, the optical signal whose intensity has been modulated is outputted in a state where the optical signal contains a direct-current light component from the intensity modulating unit 3 [refer to FIGS. 3(a) and 5].

Namely, the intensity modulating unit 3 performs an intensity modulation on one of the split lights split by the Y-shaped splitting portion 2A, and outputs an intensity-modulated optical signal containing a direct current component as a noise component, which functions as a first intensity modulating unit.

A metal such as titanium (Ti) or the like in thickness of about 900 Å is evaporated on a surface of the substrate 1, patterns are formed by photolithography and etching, and left for eight hours in oxygen at a high temperature of, for example, 1000° C. to diffuse the metal such as Ti or the like into the substrate 1, whereby the optical waveguides 2 and 3C are formed. A width of the patterns of the optical waveguides is about 7 μm. The input waveguide 2-1 and the output waveguide 2-4 are single-mode waveguides.

The travelling-wave electrode 3A and the grounding electrode 3B are formed by evaporating a metal such as gold (Au) or the like on the optical waveguide 3C. The travelling-wave electrode 3A and the grounding electrode 3B are connected to a driving circuit not shown. The travelling-wave electrode 3A and the grounding electrode 3B are applied thereto a voltage according to an input signal (modulating signal) from the driving circuit to vary a refractive index of the optical waveguide 3C, thereby modulating a direct-current light inputted from a semiconductor laser (not shown) via the inputting waveguide 2-1 and the intermediate waveguide 2-2.

The intermediate waveguide 2-3 propagates the other of the split lights split by the Y-shaped splitting unit 2A. According to the first embodiment, an optical path length of the intermediate waveguide 2-3 is adjusted such that an optical phase of the other split light is opposite to that of the above optical signal subjected to the intensity modulation. Namely, the intermediate waveguide 2-3 shifts an optical phase of the other of the split lights split by the Y-shaped splitting unit 2A such that the optical phase of the other split light is opposite to that of the above intensity-modulated optical signal, which functions as an optical phase shifting unit.

The Y-shaped recombining portion 2B recombines the two split lights propagated through the intermediate waveguides 2-2 and 2-3 and outputs a recombined light. According to the first embodiment, the Y-shaped recombining portion 2B makes the above intensity-modulated optical signal and the light whose phase has been shifted interfere with each other so as to suppress the direct current component contained in the above intensity-modulated optical signal, and outputs it. Namely, the Y-shaped recombining portion 2B functions as a direct current component suppressing unit.

In the optical modulator 10 according to the first embodiment, the Y-shaped splitting unit 2A as the power splitting unit, the intensity modulating unit 3 as the first intensity modulating unit 3, the intermediate waveguide 2-3 as the optical phase shifting unit and the Y-shaped recombining unit 2B as the direct current component suppressing unit are integrally formed using optical waveguide elements formed on the optical substrate 1.

In the optical modulator 10 according to the first embodiment of this invention with the above structure, the incident light from the input waveguide 2-1 is split into two split lights of equal power by the Y-shaped splitting portion 2A when the optical modulator 10 modulates the light propagated through the optical waveguide 2 formed on the substrate 1 and outputs it.

Following that, one of the split lights containing a direct current component split by the Y-shaped splitting portion 2A is subjected to the intensity modulation by the intensity modulating unit 3 when propagated through the intermediate waveguide 2-2. On the other hand, the other of the split lights split by the Y-shaped splitting portion 2A is subjected to the phase shift such as to have a phase opposite to that of the optical signal subjected to the intensity modulation when propagated through the intermediate waveguide 2-3 whose optical path length has been adjusted.

Figure 2:
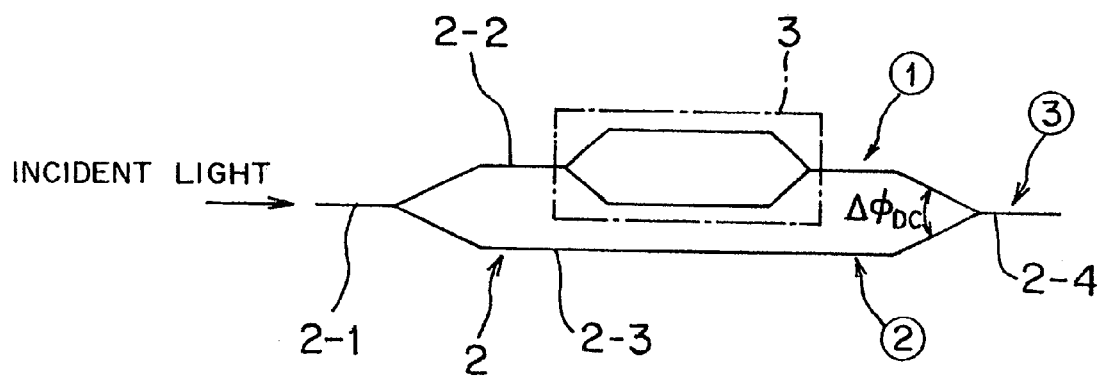
FIG. 2 is a diagram for illustrating an operation of the optical modulator according to the first embodiment of this invention.
Figure 3:
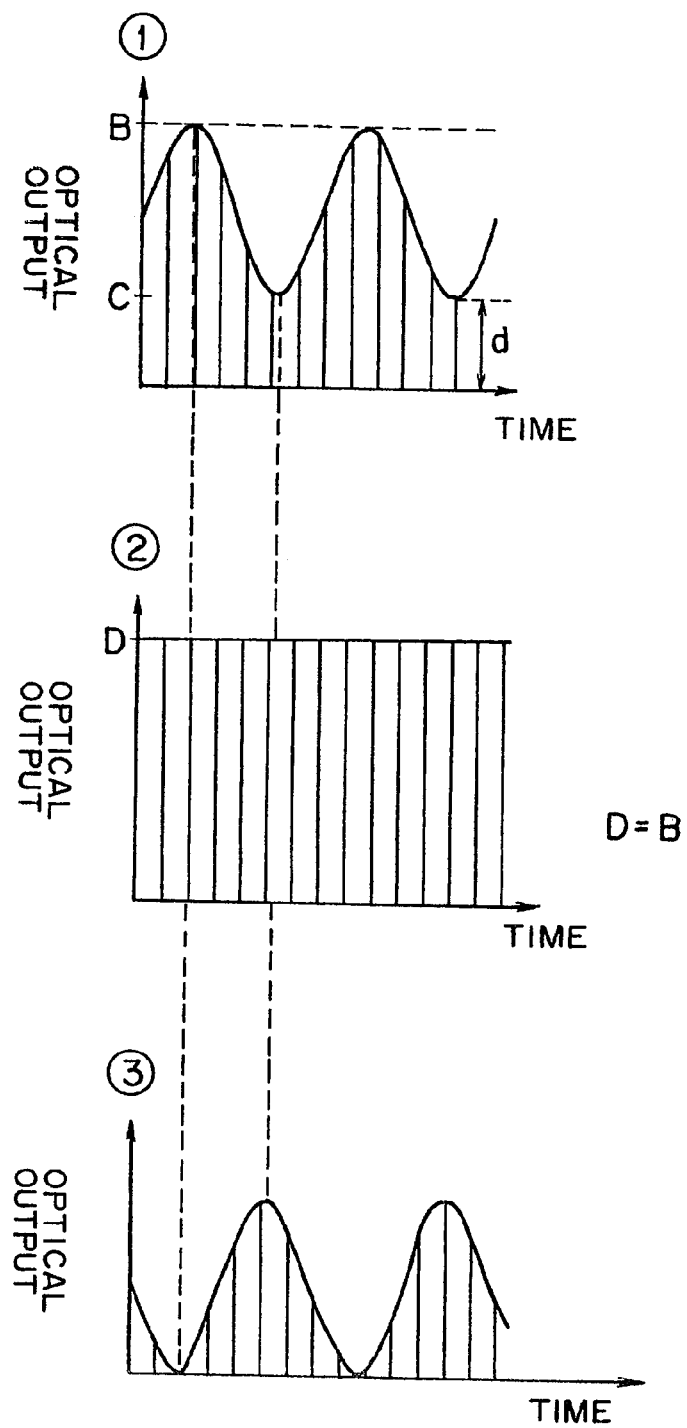
FIG. 3 is a diagram for illustrating a first mode of the operation of the optical modulator according to the first embodiment of this invention.
Figure 4A:
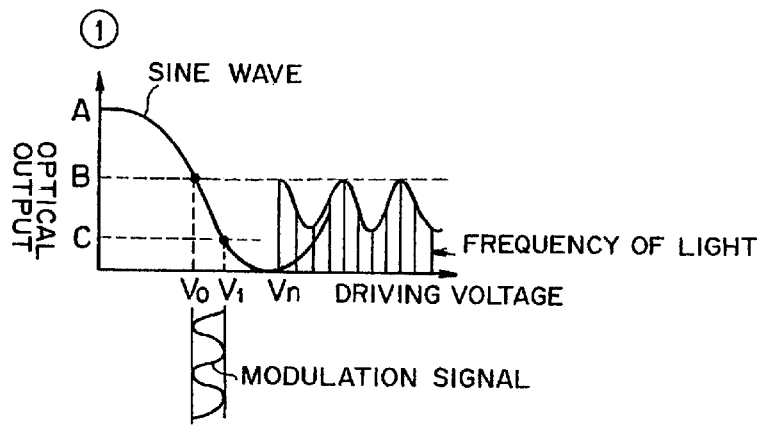
FIGS. 4(a) through 4(d) are diagrams for illustrating the first mode of the operation of the optical modulator according to the first embodiment of this invention.
Figure 4B:
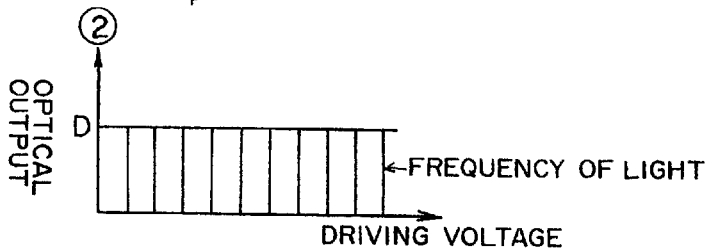

As shown in FIG. 2, the intensity-modulated optical signal propagated through the intermediate waveguide 2-2 is indicated by ①, whereas the light subjected to the phase shift propagated through the intermediate waveguide 2-3 is indicated by ②. An output waveform of the intensity-modulated optical signal and an output waveform of the light subjected to the phase shift are shown in FIG. 3. A relation between the output waveform of the intensity-modulated optical signal and a driving voltage, and a relation between the output waveform of the light subjected to the phase shift and the driving voltage are shown in FIGS. 4(a) and 4(b), respectively.

One of the split lights split by the Y-shaped splitting portion 2A is subjected to the intensity modulation in a state where the split light contains a direct current component (refer to a reference character d) as shown in ① in FIG. 3. On the other hand, the other of the split lights split by the Y-shaped splitting portion 2A is subjected to the phase shift such that only an optical phase of which is opposite to that of the above intensity-modulated optical signal although an intensity of which remains the same, as shown in ② in FIG. 3. Incidentally, ② in FIG. 3 does not show the shift of the optical phase of the split light executed.

According to the first embodiment, the Y-shaped splitting portion 2A equally splits the incident light from the input waveguide 2-1. Therefore, a power D of one of the split lights split by the Y-shaped splitting portion 2A is equal to the maximum level B of the intensity-modulated optical signal outputted from the intensity modulating unit 3, which is the other of the split lights split by the Y-shaped splitting portion 2A (refer to ① and ② in FIG. 3).

The intensity-modulated optical signal propagated through the intermediate waveguide 2-2 and the light subjected to the phase shift propagated through the intermediate waveguide 2-3 are recombined by the Y-shaped recombining portion 2B.

At this time, the intensity-modulated optical signal and the light subjected to the phase shift interfere with each other at the Y-shaped recombining portion 2B so that an optical signal whose direct current component contained in the intensity-modulated optical signal is suppressed is outputted therefrom.

In FIG. 2, the optical signal recombined at the Y-shaped recombining portion 2B and outputted to the output waveguide 2-4 is indicated by ③, and an output waveform of the optical signal is shown in FIG. 3.

According to the first embodiment, since the power D of one of the split lights split by the Y-shaped splitting portion 2A is equal to the maximum level B of the intensity-modulated optical signal outputted from the intensity modulating unit 3, which is the other of the split lights split by the Y-shaped splitting portion 2A, and phases of the two split lights are shifted 180° from each other as shown in .① and ②  in FIG. 2, an optical signal whose phase is opposite to that of the intensity-modulated optical signal and whose direct current component contained in the above intensity-modulated optical signal is suppressed is outputted to the output waveguide 2-4 as shown in ③ in FIG. 3.

Figure 4C:
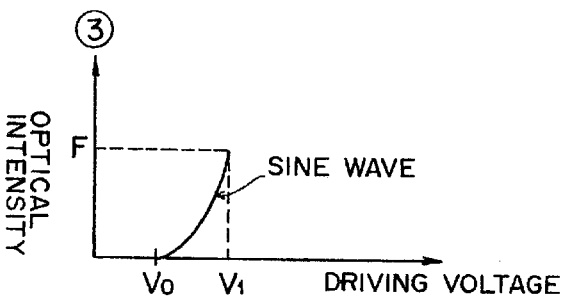

Namely, when the power D of one split light is equal to the maximum level B of the intensity-modulated optical signal and a phase difference between the two split lights at a driving voltage $V_0$ [refer to FIG. 4(a)] is π, an intensity F of the optical signal recombined by the Y-shaped recombining portion 2B and outputted is determined through an equation (1). In the equation (1), C represents the minimum level of the intensity-modulated optical signal. The intensity F of the optical signal so determined is shown in FIG. 4(c).

$$F = |\text{amplitude of C (containing phase)} + \text{amplitude of D}|^2 \quad (1)$$

Figure 4D:
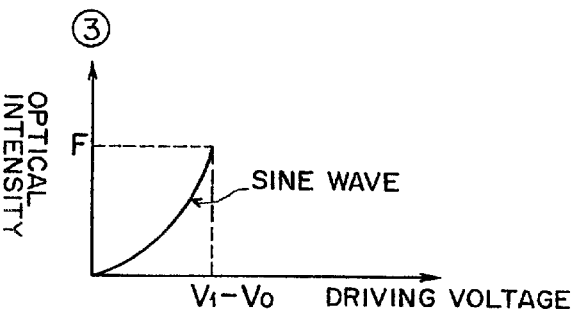

Since an optical path length of the intermediate waveguide 2-3 is adjusted in the first embodiment, it is possible to eliminate an offset of the optical wavelength corresponding to the driving voltage $V_0$ in the intensity modulating unit 3. Accordingly, the driving voltage can be 0 to $(V_0-V_1)$, as shown in FIG. 4(d).

The optical signal whose direct current component is suppressed by the Y-shaped recombining portion is outputted through the output waveguide 2-4.

In the optical modulator 10 according to the first embodiment of this invention, the intensity-modulated optical signal from the intensity modulating unit 3 and the light subjected to the phase shift when propagated through the intermediate waveguide 2-3 interfere with each other to suppress the direct current component contained in the intensity-modulated optical signal, and outputted. Consequently, it is possible to obtain a modulated optical signal with a high extinction ratio while the optical modulator is driven at a low voltage, and decrease a scale of a chip of the optical modulator.

When the optical modulator 10 according to the first embodiment is used in a transmitting unit of an optical communication system, a relation between an insertion loss and a driving voltage of the optical modulator 10 is trade-off. For this, only if the insertion loss of the optical modulator 10 is permitted, it is possible to provide the optical modulator with a high extinction ratio which can be driven at an extremely low driving voltage. In the optical communication system, it is possible to amplify a light extremely efficiently at present so that there is a great room for permission of the insertion loss of the optical modulator 10.

In the description of the first embodiment, the Y-shaped splitting portion 2A equally splits the incident light from the input waveguide 2-1 such that the power D of the split light propagated through the intermediate waveguide 2-3 is equal to the maximum level B of the intensity-modulated optical signal outputted from the intensity modulating unit 3. Alternatively, the Y-shaped splitting portion 2A may split the incident light from the input waveguide 2-1 such that the power D of the split light propagated through the intermediate waveguide 2-3 is equal to the direct current component C contained in the intensity-modulated optical signal outputted from the intensity modulating unit 3.

Figure 5:
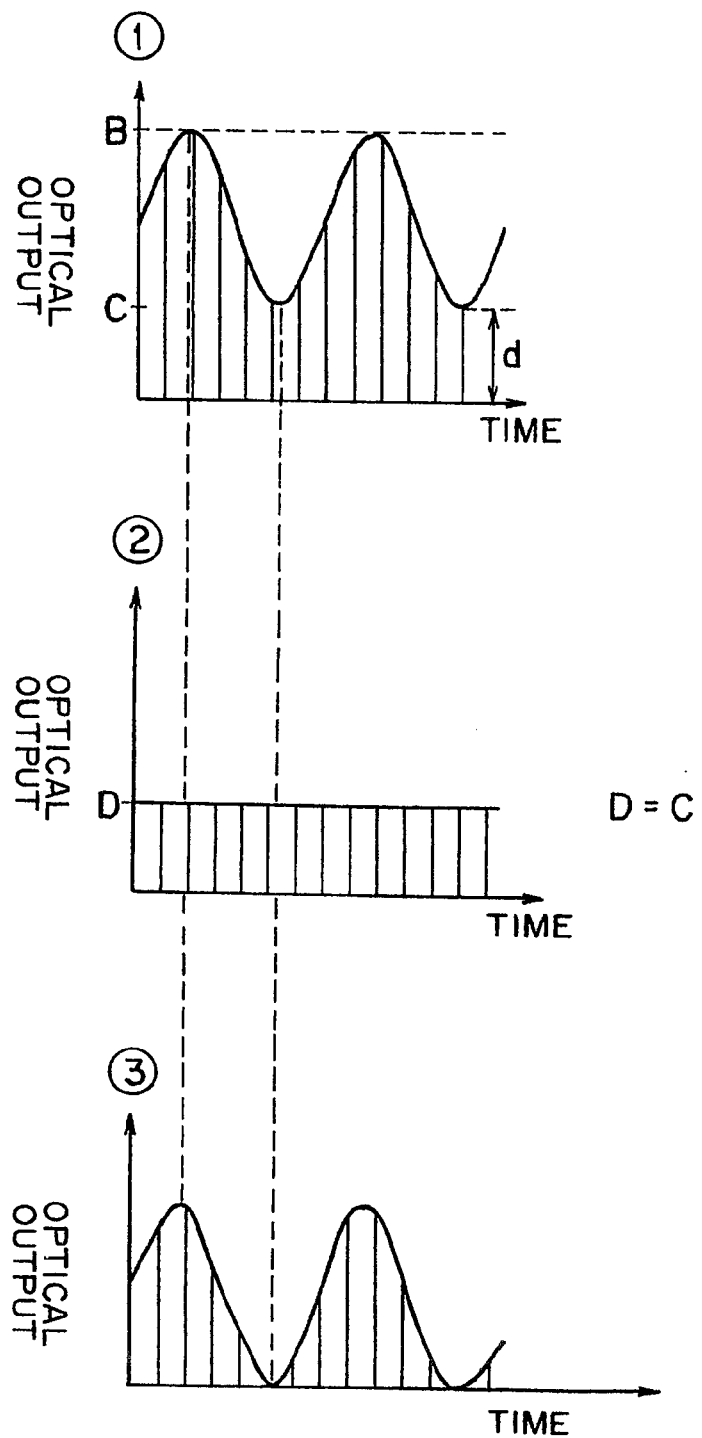
FIG. 5 is a diagram for illustrating a second mode of the operation of the optical modulator according to the first embodiment of this invention.
Figure 6:
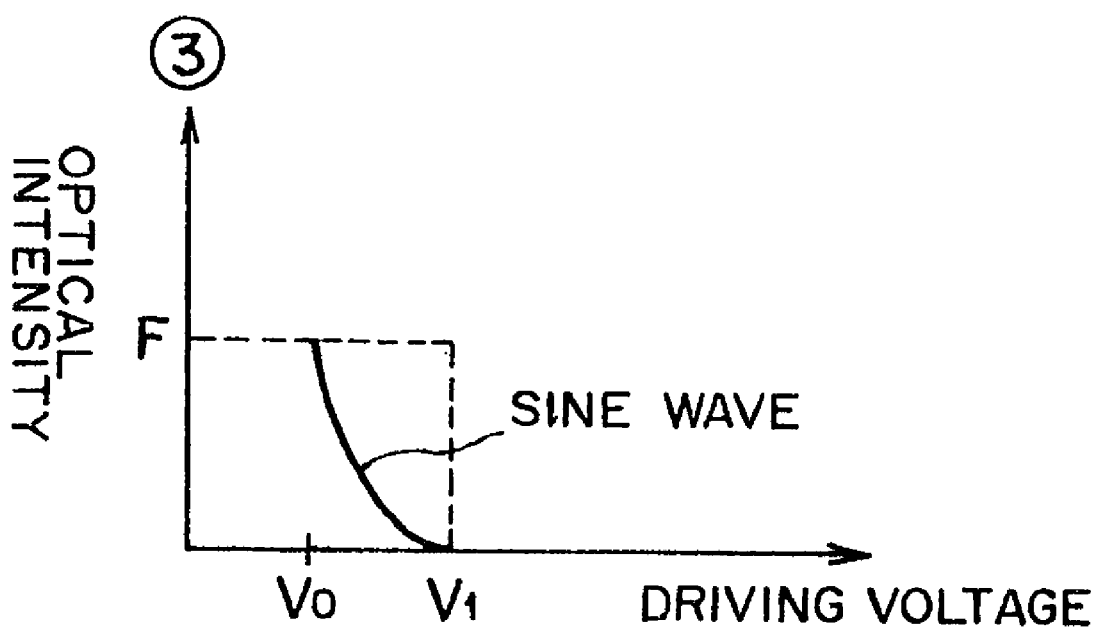
FIG. 6 is a diagram for illustrating the second mode of the operation of the optical modulator according to the first embodiment of this invention.

FIG. 5 shows an output waveform of the intensity-modulated optical signal, an output waveform of the light subjected to the phase shift and an output waveform of the optical signal recombined by the Y-shaped recombining portion 2B and outputted therefrom, in the above case. FIG. 6 shows an intensity F of the optical signal recombined by the Y-shaped recombining portion 2B and outputted therefrom, which is determined through the above equation (1).

In the above case, as shown in ① and ② in FIG. 5, the power D of one of the split lights split by the Y-shaped splitting portion 2A is equal to a direct current component C (that is, reference character d described before) contained in the intensity-modulated optical signal outputted from the intensity modulating unit 3, which is the other of the split lights split by the Y-shaped splitting portion 2A, and phases of the two split lights are shifted 180° from each other. Accordingly, an optical signal whose phase is the same as the above intensity modulated optical signal and in which the direct current component contained in the intensity-modulated optical signal is suppressed as shown in ③ in FIG. 5 is outputted to the output waveguide 2-4.

Still alternatively, the Y-shaped splitting portion 2A may split the incident light from the input waveguide 2-1 such that the power D of the split light propagated through the intermediate waveguide 2-3 is an optical power intermediate between the maximum level B of the intensity-modulated optical signal outputted from the intensity modulating unit 3 and the direct current component C.

Figure 7:
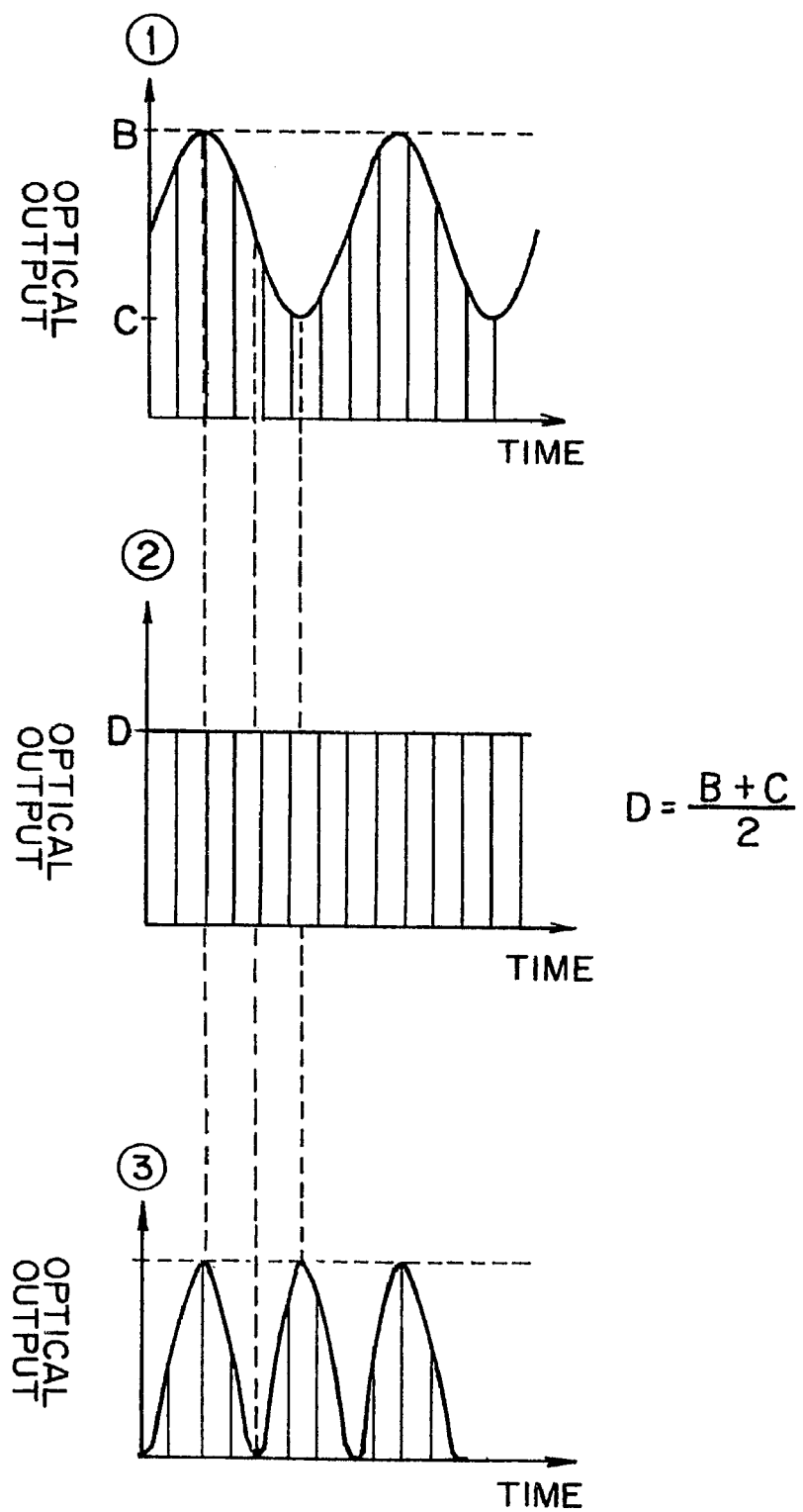
FIG. 7 is a diagram for illustrating a third mode of the operation of the optical modulator according to the first embodiment of this invention.
Figure 8:
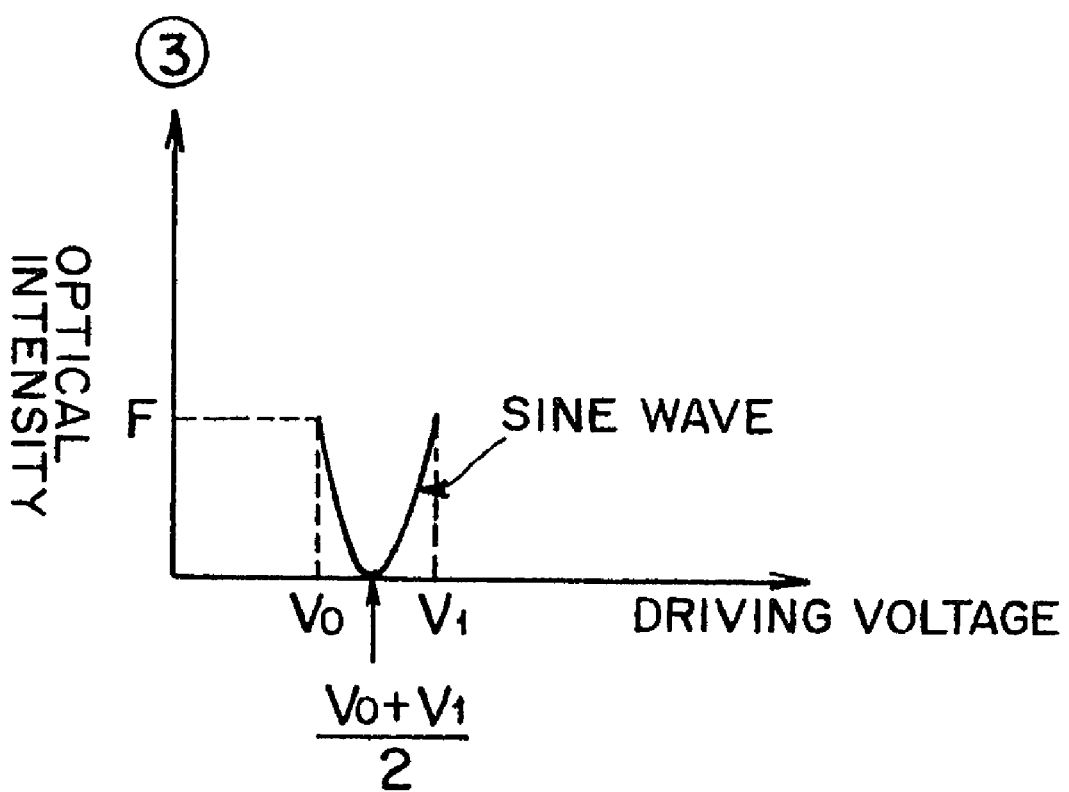
FIG. 8 is a diagram for illustrating the third mode of the operation of the optical modulator according to the first embodiment of this invention.

FIG. 7 shows an output waveform of the intensity-modulated optical signal, an output waveform of the light subjected to the phase shift and an output waveform of the optical signal recombined by the Y-shaped recombining portion 2B and outputted therefrom in this case. FIG. 8 shows an intensity F of the optical signal recombined by the Y-shaped recombining portion 2B and outputted therefrom, which is determined through the above equation (1).

In the above case, as shown in ① and ② in FIG. 7, the power D of one of the split lights split by the Y-shaped splitting portion 2A is an optical power intermediate between the maximum level B of the intensity-modulated optical signal outputted from the intensity modulating unit 3, which is the other of the split lights split by the Y-shaped splitting portion 2A, and the direct current component C, and phases of the two split lights are shifted 180° from each other. Accordingly, the optical signal in which the direct current component contained in the intensity-modulated optical signal is suppressed is outputted to the output waveguide 2-4, as shown in ③ in FIG. 7.

In the above case, if a driving voltage $V_0-V_1$ is applied to the optical modulator 10, it is possible to obtain a double-frequency output, as shown in FIG. 8. When the double frequency output is detected, it is possible to know that a deviation occurs in a setting which equalizes the power D of the split light to the maximum level B of the intensity-modulated optical signal as in the first embodiment goes wrong. Further, it is possible to apply a method for correcting the deviation.

(a1) Description of a Modification of the First Embodiment

Figure 9:
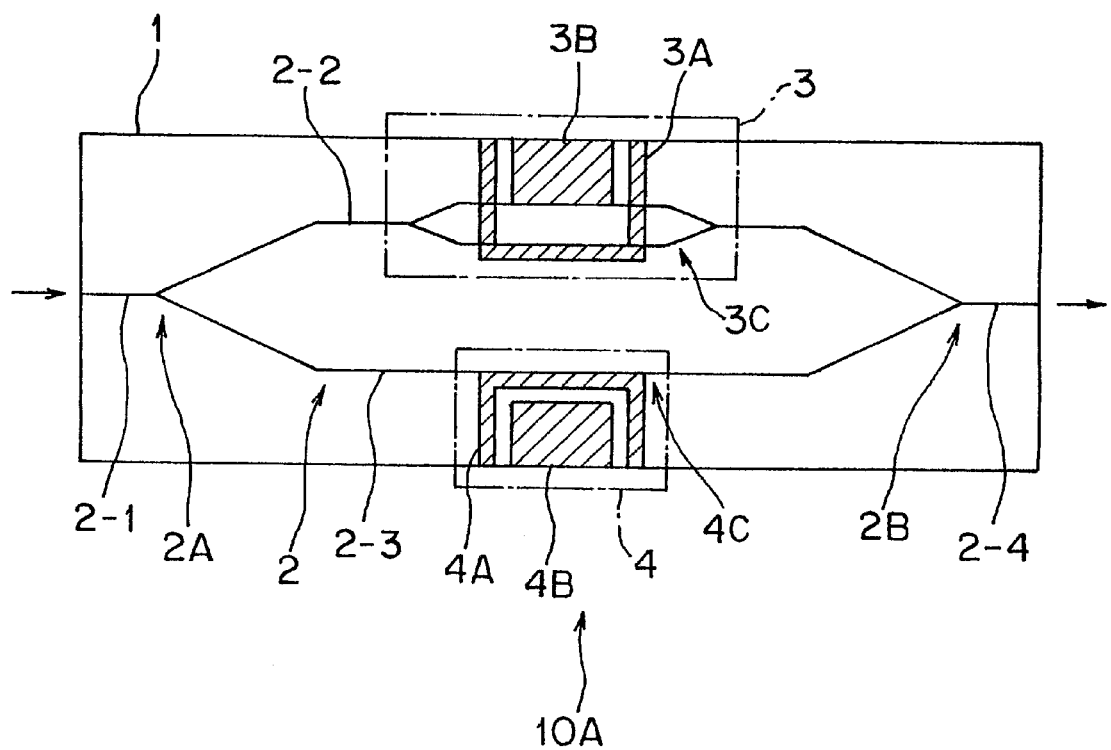
FIG. 9 is a schematic diagram showing a structure of an optical modulator according to a modification of the first embodiment of this invention.

FIG. 9 is a schematic diagram showing a structure of an optical modulator according to a modification of the first embodiment of this invention. An optical modulator 10A shown in FIG. 9 is used as an external optical modulator for modulating a light emitted from a signal source such as a semiconductor laser or the like in, for example, a transmitting unit of a ultra-high-speed optical communication system.

A substrate 1, an optical waveguide 2 and an intensity modulating unit 3 are similar to those according to the first embodiment described above. In the optical modulator 10A according to this modification, a phase modulating unit 4 is formed in a part of an intermediate waveguide 2-3.

The phase modulating unit 4 has a linear optical waveguide 4C, a travelling-wave electrode 4A and a grounding electrode 4B.

In this modification, the phase modulating unit 4 complimentarily performs a phase modulation such that an optical phase of one of the split lights split by a Y-shaped splitting portion 2A is opposite to that of the above intensity-modulated optical signal, which functions as a part of the optical phase shifting unit.

The linear optical waveguide 4C is formed similarly to the optical waveguide 2 and the optical waveguide 3C in the first embodiment.

The travelling-wave electrode 4A and the grounding electrode 4B are also formed similarity to the travelling-wave electrode 3A and the grounding electrode 3B in the first embodiment. The travelling-wave electrode 4A and the grounding electrode 4B are connected to a driving circuit not shown. A voltage from the driving circuit is applied to the travelling-wave electrode 4A and the grounding electrode 4B to change an refractive index of an optical waveguide 4C, thereby modulating a phase of a direct current light from a semiconductor laser (not shown) incident through an input waveguide 2-1 and an intermediate waveguide 2-2.

The above optical modulator 10A can give the same functions and effects as the optical modulator 10 according to the first embodiment.

The optical modulator 10A according to this modification performs the phase modulation such that one of the split lights split by the Y-shaped splitting portion 2A has an opposite phase with respect to an optical signal subjected to the intensity modulation by the phase modulating unit 4 while propagated through the intermediate waveguide 2-3.

In the optical modulator 10A, the phase modulating unit 4 has a function of complementarily adjusting a state of a phase of the split light propagated through the intermediate waveguide 2-3 so that a direct current component contained in the intensity-modulated optical signal can be more effectively suppressed.

(b) Description of a Second Embodiment

Figure 10:
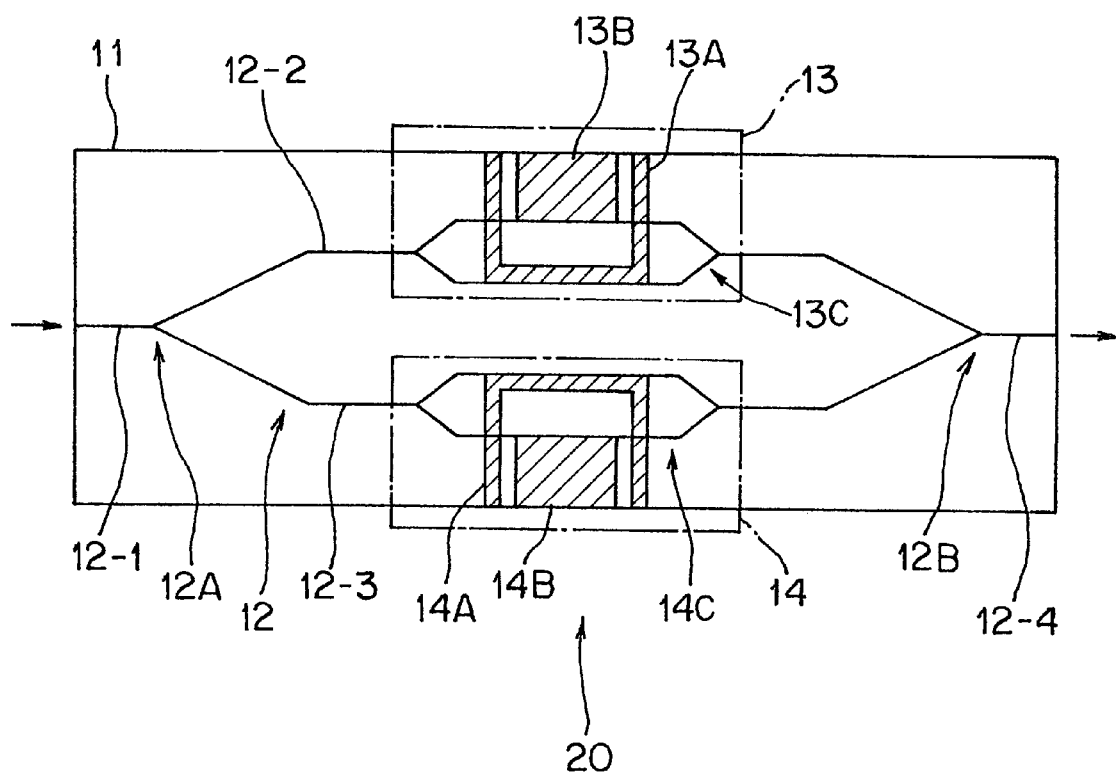
FIG. 10 is a schematic diagram showing a structure of an optical modulator according to a second embodiment of this invention.

FIG. 10 is a schematic diagram showing a structure of an optical modulator according to a second embodiment of this invention.

An optical modulator 20 shown in FIG. 10 is used as an external optical modulator for modulating a light emitted from a signal light source such as a semiconductor laser or the like in, for example, a transmitting unit of an ultra-high-speed optical communication system. An optical waveguide 12 and an intensity modulating units 13 and 14 are formed on a substrate 11, whereby a light propagrated through the optical waveguide 12 is modulated and outputted.

In the optical modulator 20, the optical waveguide 12 is configured with an input waveguide 12-1, intermediate waveguides 12-2 and 12-3 and an output waveguide 12-4. The intermediate waveguides 12-2 and 12-3 are connected in parallel to the input waveguide 12-1 and the output waveguide 12-4 via a Y-shaped splitting portion 12A and a Y-shaped recombining portion 12B.

The Y-shaped splitting portion 12A splits a power of an incident light into two split lights, which functions as a power splitting unit.

The intensity modulating unit 13 has an optical waveguide 13C of a Mach-Zehnder type, a travelling-wave electrode 13A and a grounding electrode 13B, which is formed in a part of the intermediate waveguide 12-2.

The intensity modulating unit 13 performs an intensity modulation on one of the split lights split by the Y-shaped splitting protion 12A and outputs an intensity-modulated optical signal containing a direct current component as a noise component, similarly to the intensity modulating unit 3 according to the first embodiment, which functions as a first intensity modulating unit.

The intensity modulating unit 14 has an optical waveguide 14C of a Mach-Zehnder type, a travelling-wave electrode 14A and a grounding electrode 14B, which is formed in a part of the intermediate waveguide 12-3.

The intensity modulating unit 14 performs the intensity modulation on the other of the split lights split by the Y-shaped splitting portion 12A and outputs an intensity-modulated light (that is, changes a light quantity of the other of the split lights split by the Y-shaped splitting portion 12A), which functions as a second intensity modulating unit.

The intermediate waveguide 12-3 whose optical path length is adjusted performs a phase shift on an optical phase of the other of the split lights split by the Y-shaped splitting portion 12A such that the other split light has a phase opposite to that of the above intensity-modulated optical signal, which functions as an optical phase shifting unit.

In the optical modulator 20, the intensity modulating unit 14 as the second intensity modulating unit and the intermediate waveguide 12-3 as the optical phase shifting unit are integrally formed.

The Y-shaped recombining portion 12B recombines the two split lights propagrated through the intermediate waveguides 12-2 and 12-3. According to the second embodiment, the Y-shaped recombining portion 12B makes the above intensity-modulated optical signal and the light subjected to the phase shift and the intensity-modulation interfere with each other to suppress the direct current component contained in the above intensity-modulated optical signal, and outputs it. Namely, the Y-shaped recombining portion 12B functions as a direct current component suppressing unit.

The substrate 11 and the intensity modulating unit 13 are similar to the substrate 1 and the intensity modulating unit 3 according to the above first embodiment. Further, the intensity modulating unit 14 is similar to the intensity modulating unit 3 according to the first embodiment.

The optical waveguide 12 is formed similarly to the optical waveguide 2 according to the first embodiment.

In the optical modulator 20 according to the second embodiment, the Y-shaped splitting portion 12A as the power splitting unit, the intensity modulating unit 13 as the first intensity modulating unit, the intermediate waveguide 12-3 as the optical phase shifting unit, the intensity modulating unit 14 as the second intensity modulating unit and the Y-shaped recombining unit 12B as the direct current suppressing unit, mentioned above, are integrally formed using optical waveguide elements formed on the optical substrate 11.

According to the second embodiment, the Y-shaped splitting portion 12A splits the incident light from the input waveguide 12-1 such that the maximum level C of the light subjected to the phase shift and the intensity modulation outputted from the intensity modulating unit 14 is equal to the direct current component (namely, reference character d described before) contained in the intensity-modulated optical signal outputted from the intensity modulating unit 13.

In the optical modulator 20 with the above structure according to the second embodiment of this invention, when the light propagated through the intermediate waveguide 12 formed on the substrate 11 is modulated and outputted, the incident light from the input waveguide 12-1 is split into two split lights of equal power by the Y-shaped splitting portion 12A.

Following that, one of the split lights split by the Y-shaped splitting portion 12A is subjected to the intensity modulation by the intensity modulating unit 13 when propagated through the intermediate waveguide 12-2 to be an intensity-modulated optical signal containing a direct current component.

On the other hand, the other of the split lights split by the Y-shaped splitting portion 12A is subjected to the phase shift so as to have a phase opposite to that of the optical signal subjected to the intensity modulation while propagated through the intermediate waveguide 12-3 whose optical path length is adjusted, and subjected to the intensity-modulation by the intensity modulating unit 14, at the same time.

Figure 11:
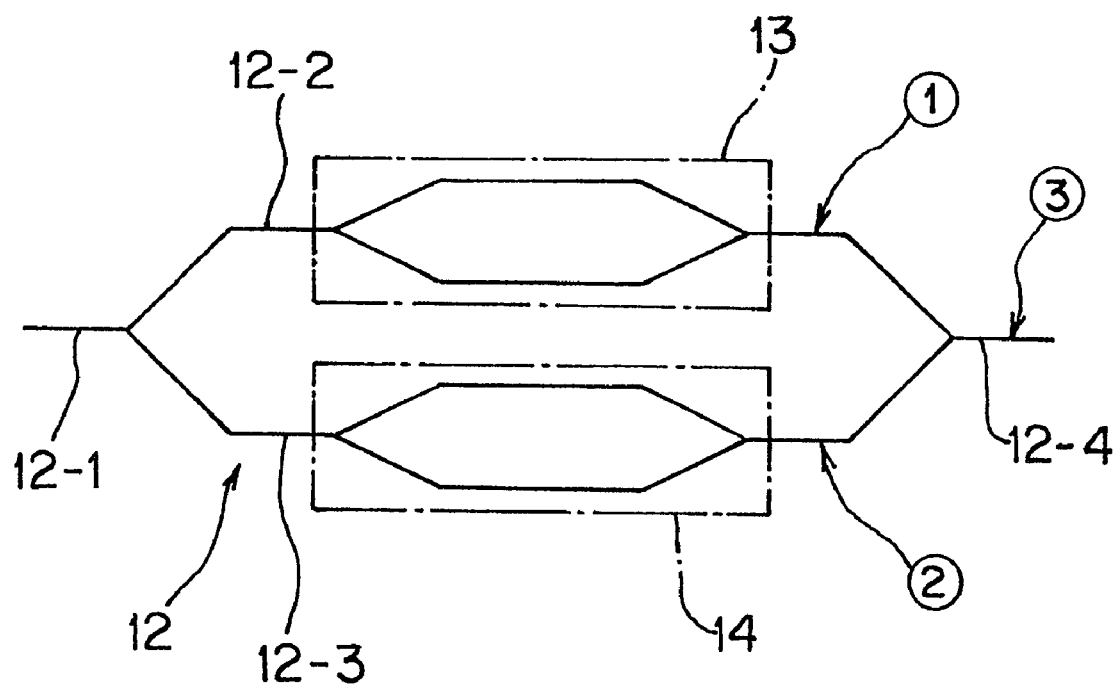
FIG. 11 is a diagram for illustrating an operation of the optical modulator according to the second embodiment of this invention.
Figure 12:
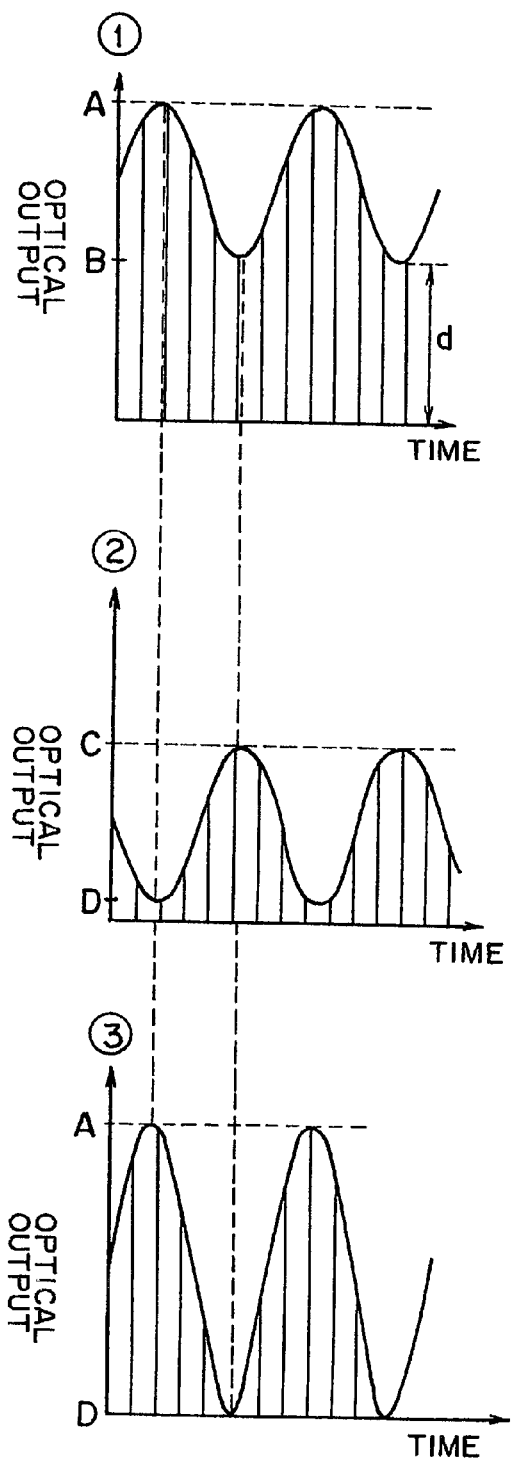
FIG. 12 is a diagram for illustrating the operation of the optical modulator according to the second embodiment of this invention.
Figure 13A:
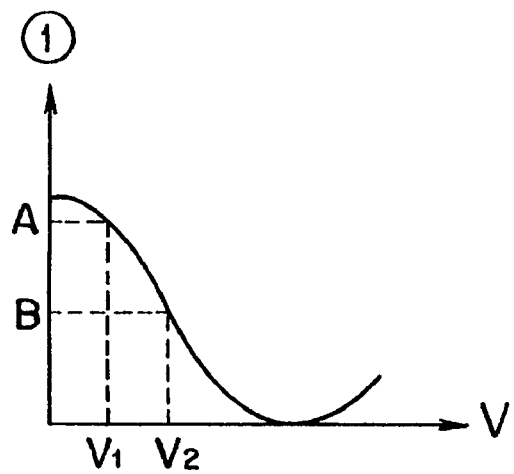
FIGS. 13(a) through 13(c) are diagrams for illustrating the operation of the optical modulator according to the second embodiment of this invention.
Figure 13B:
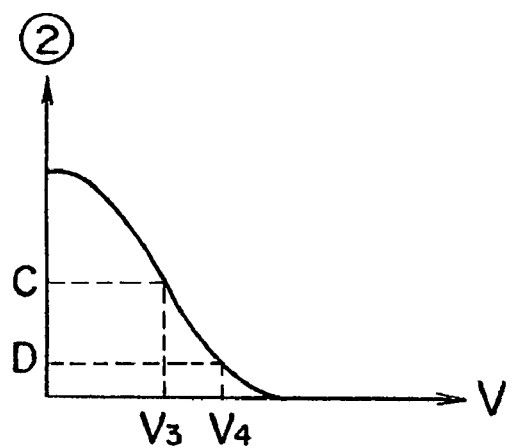

As shown in FIG. 11, the intensity-modulated optical signal propagated through the intermediate waveguide 12-2 is indicated by ①, whereas the intensity-modulated optical signal subjected to the phase shift propagated through the intermediate waveguide 12-3 is indicated by ②. FIG. 12 shows an output waveform of the intensity-modulated optical signal, and an output waveform of the intensity-modulated light subjected to the phase shift. FIGS. 13(a) and 13(b) show a relation between the output waveform of the intensity-modulated optical signal and a driving voltage, and a relation between the intensity-modulated light subjected to the phase shift and the driving voltage, respectively.

One of the split lights split by the Y-shaped splitting portion 12A is subjected to the intensity modulation in a state where the split light contains the direct current component (refer to reference character d) as shown in ① in FIG. 12. On the other hand, the other of the split lights split by the Y-shaped splitting portion 12A is subjected to the intensity modulation as shown in ② in FIG. 12, and subjected to the phase shift such that the light has an optical phase opposite to that of the above intensity-modulated optical signal.

In the second embodiment, according to a setting of a ratio of the split by the Y-shaped splitting portion, the maximum level C of the intensity-modulated light outputted from the intensity modulating unit 14, which is one of the split lights split by the Y-shaped splitting portion 12A, is equal to the direct current component B (that is, the minimum level of the intensity-modulated optical signal, denoted by reference character d described before) contained in the intensity-modulated optical signal outputted from the intensity modulating unit 13, which is the other of the split lights split by the Y-shaped splitting portion 12A (refer to ① and ② in FIG. 12).

Further, the intensity-modulated optical signal propagated through the intermediate waveguide 12-2 and the intensity-modulated light subjected to the phase shift propagated through the intermediate waveguide 12-3 are recombined by the Y-shaped recombining portion 12B.

At this time, the intensity-modulated optical signal and the intensity-modulated light subjected to the phase shift interfere with each other at the Y-shaped recombining portion 12B so that an optical signal in which the direct current component contained in the intensity-modulated optical signal is suppressed is outputted therefrom.

The optical signal recombined by the Y-shaped recombining portion 12B and outputted to the output waveguide 12-4 is indicated by ③ in FIG. 11, and an output waveform of the optical signal is shown in FIG. 12.

According to the second embodiment, the maximum level C of the intensity-modulated light outputted from the intensity-modulating unit 14, which is one of the split lights split by the Y-shaped splitting portion 12A is equal to the minimum level B of the intensity-modulated optical signal outputted from the intensity modulating unit 13, which is the other of the split lights split by the Y-shaped splitting portion 12A, and phases of the two split lights are shifted 180° from each other, as shown in ① and ② in FIG. 12. Accordingly, the optical signal having the same phase as the above intensity-modulated optical signal and in which the direct current component contained in the above intensity-modulated optical signal is suppressed is outputted to the output waveguide 12-4, as shown in ③ in FIG. 12.

Namely, when the maximum level C of the intensity-modulated light is equal to the minimum level B of the intensity-modulated optical signal, and a phase difference between the two split lights at the driving voltage $V_1$ [refer to FIG. 13(a)] is $\pi$, the maximum level C of the intensity-modulated light and the minimum level B of the intensity-modulated optical signal cancel each other.

When a phase difference between the minimum level D of the intensity-modulated light and the maximum level A of the intensity-modulated optical signal is decreased (namely, when a voltage change from the driving voltage $V_2$ to $V_1$ is synchronized with a voltage change from the driving voltage $V_3$ to $V_4$), an intensity F of the optical signal recombined by the Y-shaped recombining portion 12B and outputted therefrom is determined through an equation (2).

$$F = |\text{amplitude of A (containing phase)} + \text{amplitude of D (containing phase)}|^2 \quad (2)$$

Figure 13C:
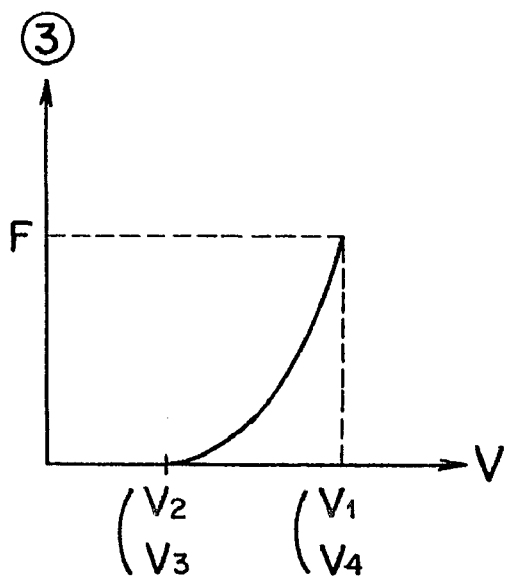

The intensity F of the optical signal determined through the equation (2) is shown in FIG. 13(c). As shown in FIG. 13(c), when the driving voltages $V_1$ and $V_4$ are applied at the same time, the intensity F of the optical signal becomes the maximum level. When the driving voltages $V_2$ and $V_3$ are applied at the same time, the intensity F of the optical signal becomes the minimum level (0 level).

According to the second embodiment, it is possible to vary an intensity of the split light by the intensity modulating unit 14. It is therefore possible to obtain an effect of decreasing a difference in phase at the intensity F of the optical signal as compared with the first embodiment, which can increase the intensity F of the optical signal as a result.

The optical signal in which the direct current component is suppressed by the Y-shaped recombining portion 12B is outputted through the output waveguide 12-4.

The optical modulator 20 according to the second embodiment of this invention makes the intensity-modulated optical signal from the intensity modulating unit 13 and the light subjected to the phase shift and the intensity modulation while propagated through the intermediate waveguide 2-3 interfere with each other to suppress the direct current component contained in the intensity-modulated optical signal, and outputs a modulated optical signal. Therefore, it is possible to obtain a modulated optical signal with a high extinction ratio although the optical modulator 20 is driven at a low voltage, thus decreasing a scale of a chip of the optical modulator.

Further, it is possible to vary an intensity of the split light by the intensity modulating unit 14 so that the optical modulator can be driven with a high extinction ratio, in an arbitrary modulation state or at an arbitrary minute voltage.

In the second embodiment, the Y-shaped splitting unit 12A may split the incident light with another different ratio, as well as the first embodiment.

(b1) Description of a First Modification of the Second Embodiment

Figure 14:
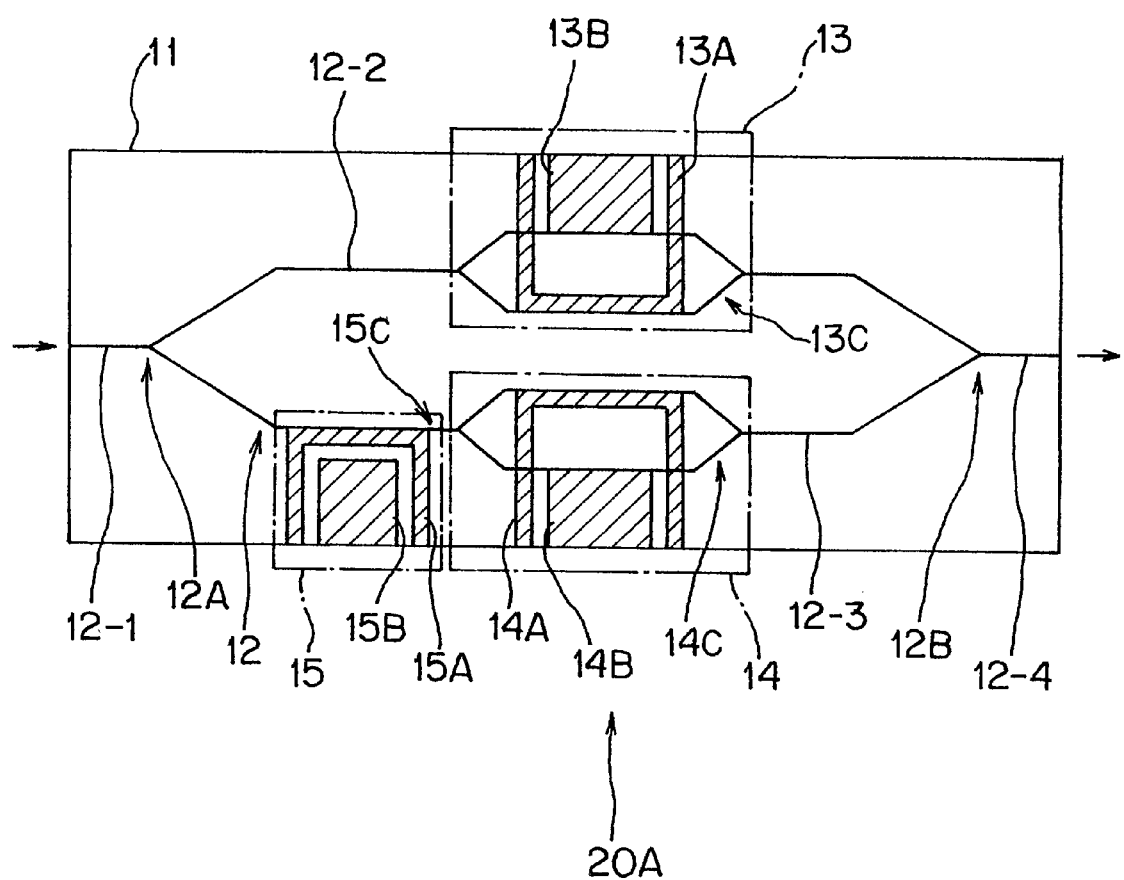
FIG. 14 is a schematic diagram showing a structure of an optical modulator according to a first modification of the second embodiment of this invention.

FIG. 14 is a schematic diagram showing a structure of an optical modulator according to a first modification of the second embodiment of this invention. An optical modulator 20A shown in FIG. 14 is used as an external optical modulator for modulating a light emitted from a signal light source such as a semiconductor laser or the like in, for example, a transmitting unit of a ultra-high-speed optical communication system.

A substrate 11, an optical waveguide 12 and an intensity modulating units 13 and 14 are similar to those according to the second embodiment described above. In the optical modulator 20A according to the first modification, a phase modulating unit 15 is formed in a part of an intermediate waveguide 12-3.

The phase modulating unit 15 is similar to the phase modulating unit 4 according to the modification of the first embodiment, which has a linear optical waveguide 15C, a travelling-wave electrode 15A and a grounding electrode 15B.

According to the first modification, the phase modulating unit 15 complementarily performs a phase modulation on an optical phase of one of split lights split by a Y-shaped splitting portion 12A such that the split light has a phase opposite to that of an intensity-modulated optical signal, which functions as a part of an optical phase shifting unit.

The optical modulator 20A can give the same functions and effects as the above-mentioned optical modulator 20 according to the second embodiment.

The optical modulator 20A according to the first modification performs the phase modulation on one of the split lights split by the Y-shaped splitting portion 12A such that the split light has a phase opposite to that of an optical signal subjected to the above intensity modulation by the phase modulating unit 15 while propagated through the intermediate waveguide 12-3.

In the optical modulator 20A, the phase modulating unit 15 has a function of complementarily adjusting a state of phase of the split light propagated through the intermediate waveguide 12-3 so that a direct current component contained in the intensity-modulated optical signal is suppressed more effectively.

(b2) Description of a Second Modification of the Second Embodiment

Figure 15:
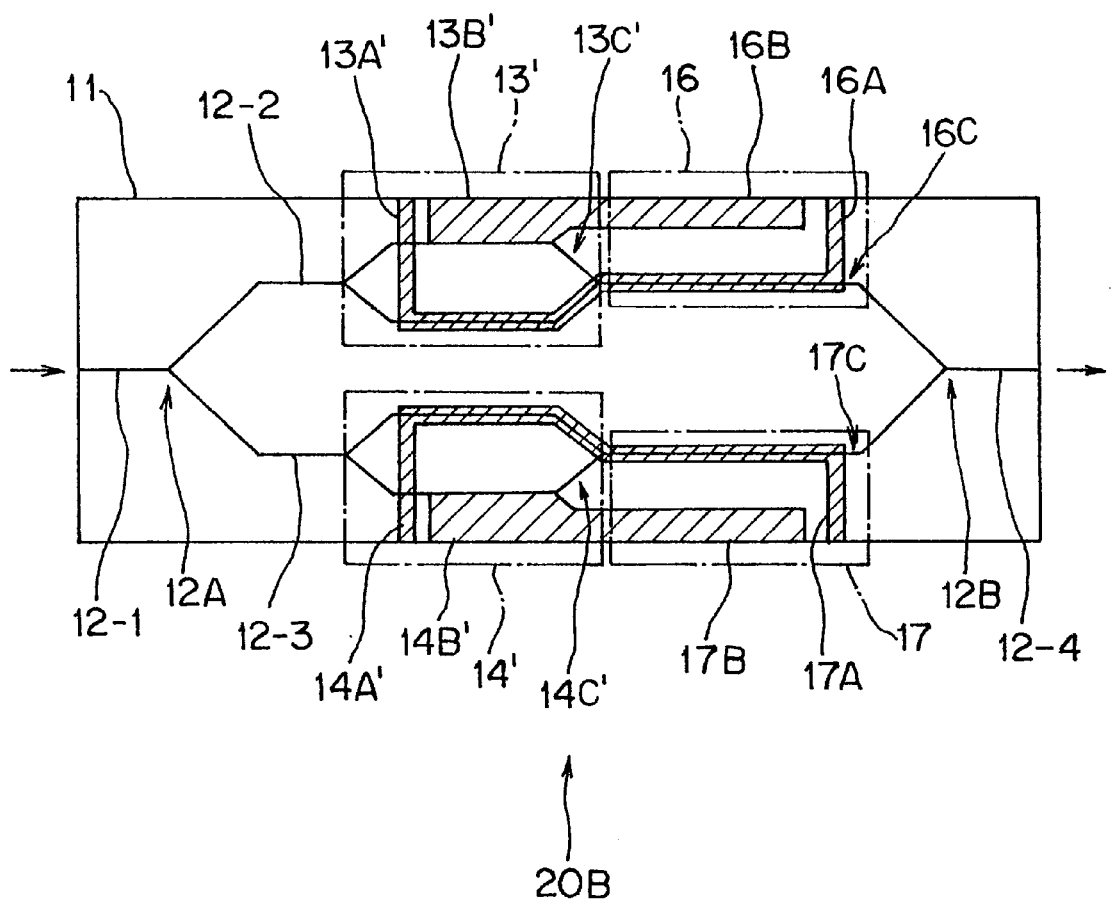
FIG. 15 is a schematic diagram showing a structure of an optical modulator according to a second modification of the second embodiment of this invention.

FIG. 15 is a schematic diagram showing a structure of an optical modulator according to a second modification of the second embodiment of this invention. An optical modulator 20B shown in FIG. 15 is used as an external optical modulator for modulating a light emitted from a signal light source such as a semiconductor laser or the like in, for example, a transmitting unit of a ultra-high-speed optical communication system.

A substrate 11 and an optical waveguide 12 are similar to those according to the above second embodiment. Intensity modulating units 13' and 14' are similar to the intensity modulating units 13 and 14 according to the above second embodiment.

In the optical modulator 20B according to the second modification, the intensity modulating unit 13' and a phase modulating unit 16 for performing a phase modulation on an optical phase of one of the split lights split by a Y-shaped splitting portion 12A are integrally formed, whereas the intensity modulating unit 14' and a phase modulating unit 17 for performing a phase modulation on an optical phase of the other of the split lights split by the Y-shaped splitting portion 12A are integrally formed.

The intensity modulating unit 13' has an optical waveguide 13C' of a Mach-Zehnder type, a travelling-wave electrode 13A' and a grounding electrode 13B'. The intensity modulating unit 14' has an optical waveguide 14C' of a Mach-Zehnder type, a travelling-wave electrode 14A' and a grounding electrode 14B'.

The phase modulating units 16 and 17 are similar to the phase modulating unit 4 according to the modification of the first embodiment. The phase modulating unit 16 has a linear optical waveguide 16C, a travelling-wave electrode 16A and a grounding electrode 16B, whereas the phase modulating unit 17 has a linear optical waveguide 17C, a travelling-wave electrode 17A and a grounding electrode 17B.

According to the second modification, the phase modulating unit 17 complementarily performs the phase modulation on an optical phase of one of the split lights split by a Y-shaped splitting portion 12A such that the light has a phase opposite to that of an intensity-modulated optical signal outputted from the intensity modulating unit 14', which functions as a part of an optical phase shifting unit.

Namely, the optical modulator 20B according to the second modification has the Y-shaped splitting portion 12A for splitting a power of an incident light into two split lights, a modulating unit for performing the intensity modulation and the phase modulation on one of the split lights split by the Y-shaped splitting portion 12A and outputting an optical signal containing a direct current component (the intensity modulating unit 13' and the phase modulating unit 16 in the second modification corresponding to the modulating unit), the optical phase shifting unit for performing the phase shift on the other of the split lights split by the Y-shaped splitting portion 12A such that the other split light has an optical phase opposite to that of the above optical signal from the modulating unit (the intermediate waveguide 12-3 and the phase modulating unit 17 corresponding to the optical phase shifting unit), and the Y-shaped recombining portion 12B for making the above optical signal from the modulating unit and the light subjected to the phase shift by the optical phase shifting unit interfere with each other to suppress the direct current component contained in the above optical signal from the modulating unit and outputting the optical signal.

The optical modulator 20B can give the same functions and effects as the optical modulator 20 according to the second embodiment.

In the optical modulator 20B according to the second modification, the two split lights split by the Y-shaped splitting portion 12A are subjected to the intensity modulation by the intensity modulating units 13' and 14' while propagated through the intermediate waveguides 12-2 and 12-3, and subjected to the phase modulation by the phase modulating units 16 and 17, respectively.

The optical modulator 20B can vary an intensity of the split light by the intensity modulating unit 14'. Therefore, it is possible to drive with a high extinction ratio the optical modulator 20B, in a state of arbitrary modulation or at an arbitrary minute voltage.

In the optical modulator 20B, the phase modulating units 16 and 17 have functions of complementarily adjusting states of phases of the two split lights propagated through the intermediate waveguides 12-2 and 12-3, respectively. Therefore, the optical modulator 20B has an effect of largely decreasing a phase difference at an intensity F of the optical signal recombined by the Y-shaped recombining portion 12B and outputted therefrom, and effectively suppressing the direct current component contained in the intensity-modulated optical signal outputted from the intensity modulating unit 13'.

What is claimed is:

1. An optical modulator comprising:
a power splitting unit for splitting the power of incident light into two courses of split light;
a first intensity modulating unit connected to said power splitting unit for modulating the intensity of light on one of said two courses of split light split by said power splitting unit and for outputting an intensity-modulated optical signal containing a direct current component;
an optical phase shifting unit connected to said power splitting unit for shifting the phase of light on the other course of split light split by said power splitting unit to produce a phase shifted optical signal having a phase 180° different from that of said intensity-modulated optical signal; and a direct current component suppressing unit connected to said first intensity modulating unit and said optical phase shifting unit for causing said intensity-modulated optical signal and said phase shifted optical signal to interfere with each other to suppress the direct current component contained in said intensity-modulated optical signal.

2. The optical modulator according to claim 1, wherein said power splitting unit splits said incident light such that the power of the light on the other course of split light is equal to the power of the direct current component contained in said intensity-modulated optical signal.

3. The optical modulator according to claim 1, wherein said power splitting unit splits said incident light such that the power of the light on the other course of split light is equal to the maximum power of said intensity-modulated optical signal.

4. The optical modulator according to claim 1, wherein said power splitting unit splits said incident light such that the power of the light on the other course of split light is at a power level intermediate between the maximum power of said intensity-modulated optical signal and the power of the direct current component.

5. The optical modulator according to claim 1, wherein said power splitting unit, said first intensity modulating unit, said optical phase shifting unit and said direct current component suppressing unit are integrally formed using optical waveguide elements formed on an optical substrate.

6. The optical modulator according to claim 5, wherein said optical phase shifting unit is an optical waveguide formed on said optical substrate and having an optical path length, the optical path length being adjusted so that the light on the other course of split light split by said power splitting unit has a phase opposite to that of said intensity-modulated optical signal.

7. The optical modulator according to claim 5, wherein said optical phase shifting unit is operable of performing a phase shift on an optical phase of the other course of split light split by said power splitting unit such that said other of split light has a phase difference of 180° to that of said intensity-modulated optical signal.

8. The optical modulator according to claim 5 further comprising a second intensity modulating unit for modulating intensity of the light on the other course of split light split by said power splitting unit, said second intensity modulating unit and said optical phase shifting unit being integrally formed.

9. An optical modulator comprising:

a power splitting unit for splitting the power of incident light into two courses of split light;

a modulating unit for modulating the intensity and phase of light on one of the two courses of split light split by said power splitting unit, and for outputting an optical signal containing a direct current component;

an optical phase shifting unit for shifting the optical phase of light on the other course of split light split by said power splitting unit to produce a phase shifted optical signal having a phase 180° different from that of the optical signal output by said modulating unit; and a direct current component suppressing unit for causing said optical signal output by said modulating unit and the phase shifted optical signal to interfere with each other to suppress the direct current component contained in said optical signal output by said modulating unit, and for outputting a suppressed optical signal.

10. An optical modulating method comprising the steps of:

when incident light is split into two courses of split light and then said split light is propagated through an optical waveguide formed on a birefringent substrate, modulating the intensity of light on one of the two courses of split light to produce a modulated optical signal containing a direct current component, and shifting the optical phase of light on the other course of split light to produce a phase shifted optical signal having a phase 180° different from that of the modulated optical signal; and causing said phase shifted optical signal and said modulated optical signal to interfere with each other to suppress the direct current component contained in said modulated optical signal, and for outputting a suppressed intensity-modulated optical signal.

11. An optical modulator comprising:

power splitting means for splitting the power of incident light into two courses of split light;

first intensity modulating means for modulating the intensity of light on one of said two courses of split light split by said power splitting means and for outputting an intensity-modulated optical signal containing a direct current component;

optical phase shifting means for shifting the phase of light on the other course of split light split by said power splitting means to produce a phase shifted optical signal having a phase 180° different from that of said intensity-modulated optical signal; and direct current component suppressing means for causing said intensity-modulated optical signal and said phase shifted optical signal to interfere with each other to suppress the direct current component contained in said intensity-modulated optical signal.

* * * * *